June 9, 1964   S. A. HALABY   3,136,487
FLUID SPRAYER APPARATUS
Filed April 25, 1962

INVENTOR.
SAMUEL A. HALABY
BY Thomson, Roessel
& Schoull
ATTORNEYS

3,136,487
FLUID SPRAYER APPARATUS
Samuel A. Halaby, Rochester, N.Y., assignor to Samuel Halaby, Inc., Rochester, N.Y., a corporation of New York
Filed Apr. 25, 1962, Ser. No. 190,110
5 Claims. (Cl. 239—351)

This invention relates to apparatus for spraying atomized fluid, and particularly to apparatus of this nature adapted for operational attachment to standard size containers of insecticides.

It is a significant object of my invention to provide spray apparatus with directional adjustment of the spray nozzle.

It is another object of my invention to provide spray apparatus having a substantially cylindrical vessel or drum rotatably mounted to a support member in order to provide manually controlled directional adjustment of the spray nozzle.

It is a further object of my invention to provide spray apparatus of the nature above described having a support member adapted to be releasably attached to a container of selected size, with the spray apparatus having an attachment extending from the nozzle of the sprayer into the container for conducting the fluid to be sprayed from the container to the nozzle.

Figure 1:
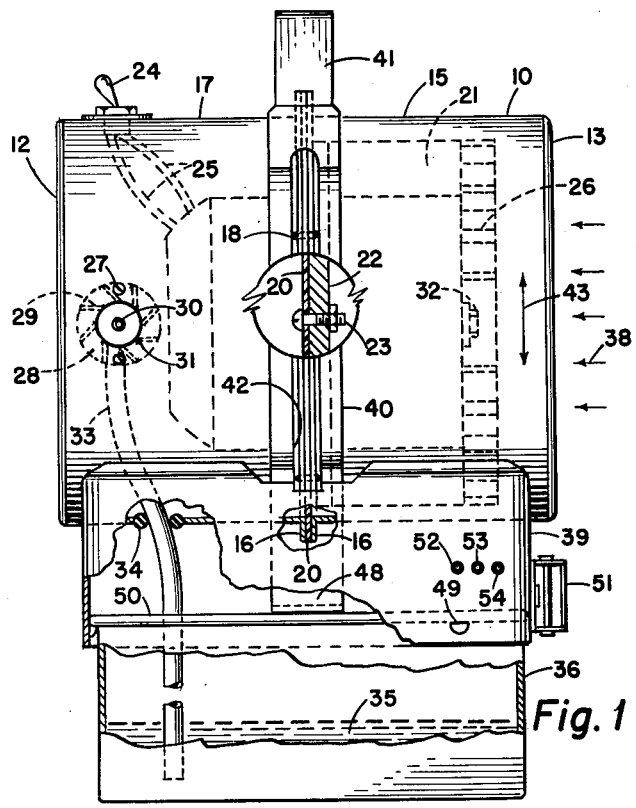
Figure 2:
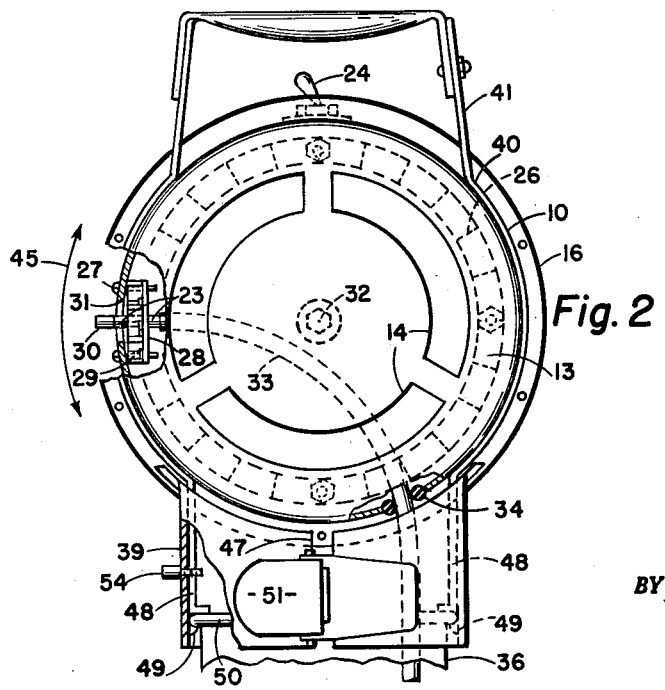

Other objects and advantages of my invention will be particularly set forth in the claims and will be apparent from the following description, when taken in connection with the accompanying drawings, in which:

FIG. 1 is a side elevational view of one embodiment of my invention with parts broken away; and FIG. 2 is a right hand end elevational view of the embodiment illustrated in FIG. 1 with parts broken away.

With reference to the figures, the illustrated invention includes a substantially cylindrical vessel or drum 10. One end 12 of the vessel is closed while the other end 13 has openings 14. The vessel 10 is formed in two halves 15 and 17, each having mating flanges 16 rigidly mounted together, as for example, by rivets 18 compressing gasket faces of an annular rigid plastisol gasket 20 intermediate flanges 16. The gasket faces of gasket 20 extend radially into the vessel 10.

A motor 21 (shown in broken line FIG. 1) has a perforated annular flange 22 (see enlarged circled portion of FIG. 1) rigidly connected, by a plurality of bolts 23, to rigid gasket 20. The motor is operationally controlled by a switch 24 having wires 25 extending to the motor. A fan having radial vanes 26 is rigidly connected at 32 to the drive shaft of motor 21.

Rigidly mounted inside of vessel portion 17, as for example by screws 27, is a circular disc 28 (FIG. 2), rigidly carrying vanes 29 (FIG. 1). One of the functions of vanes 29 is to space disc 28 from the interior circumference of the vessel 10 to permit the passage of air therebetween. Disc 28 rigidly carries a tubular fitting or conduit 23 extending therethrough axially of the vanes 29. Fitting 23 threadedly receives a nozzle 30 at its outside end in a manner projecting the nozzle 30 axially through a larger concentric opening or hole 31 of vessel 10. Nozzle 30 has an orifice of selected size communicating with a tube or a conduit 33 attached to the inside end of fitting 23. Tube 33 extends across the vessel 10, in the manner illustrated in FIG. 2. Tube 33 is supported by a resilient ring 34 at a hole substantially at the bottom of the vessel 10. By means of the internal threads of fitting 23 adapted to receive nozzle 30, nozzles such as 52–54 having orifices of selected sizes are interchangeable with nozzle 30. Interchangeable nozzles 52–54 are carried in spaced threaded holes in a collar or support member 39 for convenience of the operator.

The lower end of hose 34 is submerged in a fluid 35, such as an insecticide, held in a container 36. While my invention is particularly suited for disinfecting with insecticides (fluid 35), it is adapted for use with any fluid to be sprayed.

When rotated by motor 21, fan vanes 26 suck air through the vessel openings 14, as indicated by arrows 38; the air then passes through the perforations (not shown) of motor flange 22 and is discharged through vanes 29 and opening 31 of the vessel. The vanes 29 extend to opening 31 and create a spiral current of air being discharged out of opening 31, thereby to more effectively aspirate fluid 35 through tube 33 and out nozzle 30.

Perhaps the most significant feature of my invention resides in the manner in which cylindrical vessel 10 is rotatably supported on collar or support member 39. Support member 39, in turn, is releasably attachable to containers such as 36. A strap or brace 40 surrounding vessel 10 has a handle portion 41 at its upper end and terminates at its upper end and terminates at its lower end in two right angle members 48 rigidly mounted to the interior surfaces of support member 39. The main portions of strap 40 are of arcuate configuration conforming to the cylindrical contour of vessel 10 for rotatably embracing the vessel. Each of the arcuate portions of strap 40 is provided with a slot or groove 42 rotatably receiving flanges 16 and gasket 20. It is understood that this arrangement permits rotation of the vessel 10 relative to the support member 39 as indicated by the double headed arrows 43 (FIG. 1) and 45 (FIG. 2). This construction provides a convenient arrangement whereby the operator may directionally adjust the position of the nozzle 30 about the horizontal axis of vessel member 39.

The main portion of the support 39 generally defines a collar of selected figuration adapted to surround the upper end of container 36. The support 39 is preferably constructed of compliant material such as steel or aluminum. At least one end of the compliant support member 39 is split, as for example, at 47 in order to permit the support member 39 to receive the top of the container 36.

Right angle members 48 are adapted to engage the upper edge of container 36; a plurality of cooperating projections 49 partially stamped out of the sidewall of support member or collar 39 receive a lower edge of a rolled rim or flange 50 extending around the top edge of container 36. A vise-type catch 51 is provided across split 47 for compressing compliant support member 39 to lock the rim 50 between right angle members 48 and projections 49. In this manner, the support 39 is releasably attachable to the container 36.

While I have shown and described the preferred form of mechanism of my invention it will be apparent that various modifications and changes may be made therein, particularly in the form and relation of parts, without departing from the spirit of my invention as set forth in the appended claims.

I claim:
1. Fluid sprayer attachment comprising, in combination:
    (a) a vessel member having a cylindrical outer surface;
    (b) a radially disposed nozzle on the circumference of said cylindrical outer surface communicating with a source of fluid;
    (c) pressure means communicating with said nozzle selectively forcing said fluid from said nozzle;
    (d) a support member rotatably supporting and embracing said cylindrical outer surface for rotation about its longitudinal axis lying in a horizontal plane;
    (e) one of said vessel and support members having a circumferential radial flange; and
    (f) the other of said members having an opening for rotatably receiving said flange.

2. A fluid sprayer attachment in accordance with claim 1 in which said support member comprises:
   (g) a base and substantially arcuate shaped member extending normal to said base and rotatably embracing said cylindrical outer surface.

3. Sprayer attachment in accordance with claim 2 in which said base comprises:
   (h) a compliant collar peripherally surrounding the top of a fluid container of selected configuration;
   (i) said collar having a split; and
   (j) vise means intermediate said split for releasably gripping said collar onto said container top.

4. A sprayer attachment in accordance with claim 3 in which:
   (k) said arcuate shaped member has a handle at the top.

5. Fluid sprayer attachment in accordance with claim 2 in which said vessel comprises: a pair of drums having cooperative radial flanges and a substantially rigid radial gasket rigidly mounted intermediate said flanges for supporting said pressure means interiorly of said vessel, and in which said flanges are rotatably received within an opening extending vertically in said arcuately shaped member.

References Cited in the file of this patent

UNITED STATES PATENTS

| | | |
|---|---|---|
| 1,402,744 | Deck | Jan. 10, 1922 |
| 1,748,138 | McBride | Feb. 25, 1930 |
| 2,635,920 | Boyce | Apr. 21, 1953 |
| 2,685,476 | Spreng | Aug. 3, 1954 |
| 2,705,171 | Ziherl | Mar. 29, 1955 |
| 2,768,859 | Patterson | Oct. 30, 1956 |

FOREIGN PATENTS

| | | |
|---|---|---|
| 227,186 | Great Britain | Jan. 9, 1925 |
| 859,114 | Great Britain | Jan. 18, 1961 |
| 1,117,245 | France | Feb. 20, 1956 |